United States Patent [19]

Eguchi et al.

[11] 4,262,041
[45] Apr. 14, 1981

[54] PROCESS FOR PREPARING A COMPOSITE AMPHOTERIC ION EXCHANGE MEMBRANE

[75] Inventors: Tamiyuki Eguchi; Seiichi Mori; Masaaki Shimokawa, all of Kobe, Japan

[73] Assignee: Kanegafuchi Kagaku Kogyo Kabushiki Kaisha, Osaka, Japan

[21] Appl. No.: 874,687

[22] Filed: Feb. 2, 1978

[51] Int. Cl.³ .................... B05D 3/10; B05D 5/00
[52] U.S. Cl. .................... 427/245; 210/500.2; 210/506; 427/340; 521/27; 521/28; 521/32; 521/33
[58] Field of Search ........... 260/2.2 R, 2.1 M, 2.1 E; 427/245, 340, 385 R; 210/500 M, 506; 521/27, 28, 32, 33

[56] References Cited

U.S. PATENT DOCUMENTS

| | | | |
|---|---|---|---|
| 3,663,263 | 5/1972 | Bodre et al. | 427/385 R X |
| 3,868,314 | 2/1975 | Mizutani et al. | 210/500 M X |
| 3,878,092 | 4/1975 | Fuller | 427/385 R X |
| 3,945,927 | 3/1976 | Imai et al. | 210/500 M |
| 3,957,698 | 5/1976 | Hatch | 521/28 |
| 3,963,662 | 6/1976 | Fujiwara et al. | 260/2.1 M X |
| 4,012,324 | 3/1977 | Gregor | 210/500 M |
| 4,014,798 | 3/1977 | Rembaum | 210/500 M |
| 4,115,297 | 9/1978 | Bolto et al. | 521/32 |
| 4,119,581 | 10/1977 | Rembaum et al. | 521/27 |

*Primary Examiner*—Ronald H. Smith
*Assistant Examiner*—Thurman K. Page
*Attorney, Agent, or Firm*—Armstrong, Nikaido, Marmelstein & Kubovcik

[57] ABSTRACT

A process for preparing a composite amphoteric ion exchange membrane, which comprises forming a thin membrane not exceeding 5 microns thick by applying to a surface of a microporous polymer substrate having a physical, selective permeability of its own, a coating consisting of a polymer having either a cation or anion exchange group and a functional group capable of receiving another ion exchange group having an opposite sign from the cation or anion exchange group or a mixture of two polymers one of which has either a cation or an anion exchange group and the other of which has a functional group capable of receiving an ion exchange group having an opposite sign from the cation or anion exchange group, and introducing the ion exchange group having an opposite sign to said functional group to provide a ratio of anion to cation exchange capacity in the range of from 0.5 to 2.0.

14 Claims, No Drawings

PROCESS FOR PREPARING A COMPOSITE AMPHOTERIC ION EXCHANGE MEMBRANE

BACKGROUND OF THE INVENTION

The present invention relates to a process for preparing a composite ion exchange membrane containing both anion and cation exchange groups. More specifically, the present invention relates to a process for preparing a composite amphoteric ion exchange membrane which can be obtained by forming a thin layer less than several microns containing both anion and cation exchange groups on a microporous polymer substrate having a selective permeability of its own.

It has been known that the membrane which has anion and cation exchange groups separately without forming any salts provides characteristic effects in permeability. For example, piezodialysis is a typical example of this type of effect. According to the research of the present inventors, it has become clear that a membrane having properly combined anion and cation exchange groups also shows selective permeability for inorganic ions. The membrane having such an amphoteric property, therefore, will be able to separate a low molecular organic substance from an inorganic salt, acid, or alkali as well as salt from acid, or salt from alkali.

By the method already known in U.S. Pat. No. 3,945,927, composite ion exchange membranes having anion and cation exchange groups can be obtained resulting in considerably higher mechanical strength. However, because an anion, or a cation group is introduced into a non-polar polymer membrane, the process and conditions of the reaction naturally become complex and various difficulties are apt to follow.

The present inventors have made an extensive study to eliminate these drawbacks and finally completed the present invention, which comprises forming a thin polymer membrane having either an anion or a cation exchange group onto a microporous polymer substrate and introducing another ion exchange group of an opposite sign into the polymer membrane. Thus, the present invention has made it possible to simplify the process and conditions of the reaction of a large extent.

DETAILED DESCRIPTION OF THE INVENTION

The present invention provides a process for preparing a composite amphoteric ion exchange membrane, which comprises forming a thin membrane not exceeding 5 microns by coating a microporous polymer substrate having a physical, selective permeability of its own with a solution or an emulsion consisting of (A) a polymer having (1) either a cation or an anion exchange group and (2) a functional group which is capable of receiving another ion exchange group having an opposite sign from the cation or anion exchange group, or (B) a mixture of two polymers (1) one of which has either a cation or an anion exchange group and (2) the other of which has a functional group which is capable of receiving an ion exchange group having an opposite sign from the cation or anion exchange group, and introducing the ion exchange group of an opposite sign to said functional group so as to provide a ratio of anion to cation exchange capacity in the range of 0.5 to 2.0 and a composite amphoteric ion exchange membrane prepared by this process.

A composite amphoteric ion exchange membrane prepared by this process generally provides excellent results in separating a low molecular weight organic substance from inorganic salt, acid or alkali as well as salt from acid or alkali with exceedingly larger permeation fluxes than the composite amphoteric ion exchange membrane prepared by the process of U.S. Pat. No. 3,945,927 in which an anion and cation are introduced after coating a substrate with a solution of polymer having functional groups capable of receiving ion exchange groups.

In the present invention, a functional group capable of receiving ion exchange groups is defined as a functional group which reacts easily to form an ion exchange group.

The microporous polymer substrate employed in the present invention, by itself, can be used for ultrafiltration or serve as a microfilter material because it does not allow any polymer forming the thin layer to permeate. The microporous substrate supports the thin polymer membrane with which it is coated, and the substrate itself does not affect the permeability of the thin membrane. The fractionation capacity of the microporous substrate is thus preferably in the range of 10,000 and 80,000. The finer the pore, the substrate itself affect the permeability of the thin membrane. On the other hand, when the pore is coarser, the thickness of amphoteric ion exchange layer increases substantially due to the impregnation of the coating polymer solution, and the permeation flux of the resulting composite membrane become smaller.

The material of the substrate desirably has a chemical and physical resistance to solvents used for the polymer coating, to the reaction medium employed in introducing an ion exchange group, and, naturally, it is preferred that the substrate material be of the type where the appropriate porosity can be easily formed. Among the substrate materials that may be employed are included polyvinyl chloride, polyvinylidene chloride, polyvinylidene fluoride, chlorinated polyethylene, polystyrene, polysulfone, polyphenylene oxide and the like. Processes for manufacturing a porous material from these polymers are generally known. For example, a general film-making process consists of flowing and spreading uniformly a polymer solution on a flat surface, and immersing an undried film gel in a gelation liquid that is a non-solvent for the polymer and miscible with a solvent used for the dissolution of the polymer.

One can coat the microporous polymer substrate thus obtained with another polymer having either an anion or a cation exchange group to provide a membrane not exceeding 5 microns thick, preferably not exceeding 1 micron thick.

The thickness of the membrane can be varied by adjusting film-making conditions. Briefly, in the case of the flowing-spreading method, the thickness of the coating can be controlled by adjusting the flow rate and concentration of the polymer solution or the conveyance speed of the substrate to be coated, the conditions being varied separately or in combination with each other. In the case of the dipping method, coatings can be controlled by adjusting the dipping time as well as the concentration of the polymer solution and the conveyance speed of the polymer material. The dipping method is preferable and is suitable for making a thin membrane, because of its simplicity and versatility.

Generally, a composite membrane having excellent adhesion to a substrate is difficult to obtain by only coating the surface of the substrate with another polymer. However, when there are micropores on the surface of the substrate, excellent adhesion may be obtained and it is nearly impossible to separate the coating from the substrate. In the present invention, even by the use of a substrate having pores so fine as to hinder the permeation of the coating polymer, a composite membrane with remarkably strong adhesion has been obtained.

Until now, there have been known many polymer materials which have either an anion or a cation exchange group only. The present invention is characterized in that (A) a polymer having (1) either an anion or a cation exchange group and (2) a functional group which is capable of receiving an ion exchange group of an opposite sign or (B) a mixture of two polymers, (1) one of which has either an anion or a cation exchange group and (2) the other of which has a functional group which is capable of receiving an ion exchange group of an opposite sign can favorably be employed.

Among the polymer materials employed in the present invention are those polymerized from a monomer unit having attached thereto a cation exchange group, for example, sulfonic acids such as vinylsulfonic acid, styrenesulfonic acid, vinyltoluene sulfonic acid and the like, or carboxylic acids such as methacrylic acid, acrylic acid and the like. These polymer materials may also contain a monomer unit having a functional group which is capable of receiving an anion exchange group, for example, a monomer unit having an active halogen such as chloromethyl styrene, bromomethyl styrene, chloromethyl vinyl naphthalene, bromomethyl vinyl naphthalene, vinyl chloride and the like, or a mixture of polymers containing the different monomer units as mentioned.

Alternatively, among monomers having an anion exchange group, which can be polymerized to provide the polymer coating in the present invention, are included vinylbenzyl ammonium salts such as p-vinylbenzyl trimethyl ammonium chloride; aminomethyl styrene such as p-N,N-dimethyl aminomethyl styrene, p-N-methylamino methylstyrene, p-aminomethyl styrene and the like; or a monomer unit having a primary to a quarternary ammonium radical such as vinylpyridine, N-methylvinylpyridinium chloride, vinyltrimethyl ammonium chloride and the like. The polymer materials prepared by polymerizing the monomer mentioned above may also contain a monomer unit having a functional group which is capable of receiving a cation exchange group, for example, a monomer unit which is capable of receiving a sulfonic acid group such as styrene, vinyl toluene, vinyl naphthalene; a monomer unit which is capable of receiving a carboxylic acid group such as acrylonitrile, methacrylonitrile, acrylic acid esters and methacrylic acid ester or a mixture of polymers containing a different monomer unit as mentioned.

Cross-linking in the coated polymer is not necessary when the ion-exchange capacity is small, but when it amounts to 2 meq or more, the use of another monomer which provides a cross-linking point is preferable, since the polymer coated on the substrate swells remarkably or sometimes dissolves in a polar solvent like water or alcohol. Among the polymers providing a site for cross-linking are included styrene, chloromethyl styrene, bromomethyl styrene, butadiene, acrylic acid, methacrylic acid, acrylonitrile, methacrylonitrile, vinyl alcohol and the like. The time of cross-linking is preferably conducted after coating of the polymer and before the reaction for introducing an ion exchange group of an opposite sign. The cross-linking prevents the coated polymer from dissolving during the reaction of introducing the ion exchange group.

Because the polymer materials having an ion exchange group generally easily dissolve in alcohol, water, alcohol hydrate, a mixed solution of these and the other organic solvents such as acetone and chloroform, which are non-solvents of the substrate polymers, they can be coated on the surface of the microporous polymer substrate without causing the polymer solution to stop up the micropores of the substrate. In this aspect too, the present invention is superior to the method of U.S. Pat. No. 3,945,927 in which organic solvents without stopping up or deteriorating the porosity of the polymer substrate can not be found easily, because a non-polar polymer is used as the thin membrane. Sufficient care must be taken not to stop up or deteriorate the porosity of the polymer substrate when introducing an ion exchange group. The introduction reaction can be carried out in a medium of an inorganic reagent, in an aqueous solution, in an alcoholic solution or in another solution which does not impregnate the substrate such that the micropores of the substrate will be lost by any impregnation. As sulfonic groups can be introduced by reacting concentrated sulfuric acid with a monomer unit to be readily sulfonated, the microporous material, except polysulfone, can be employed in this case. Furthermore, because carboxylic acid groups can be introduced by the hydrolysis of a monomer unit to be readily hydrolyzed with acid or alkali, all microporous materials above mentioned can be used.

An anion exchange group can be introduced, for instance, by adding a primary, secondary or tertiary amine to a monomer unit having an active halogen in a medium of alcohol or water. Therefore, all of the above-mentioned microporous materials can also be used.

The cross-linking reaction can be accomplished by using a monomer unit having a functional group capable of being cross-linked. When the monomer is butadiene, in the presence of sulfuric acid, cross-linking can be completed intermolecularly by a mechanism of a cyclic reaction between each double bond in the polymer chain. The polymer material containing chloromethyl styrene and styrene can be cross-linked by forming a methylene bond resulting from elimination of hydrochloride in the presence of sulfuric acid.

In the case of acrylonitrile or methacrylonitrile, by applying formaldehyde, cross-linking of the monomer can be accomplished with the aid of the catalytic action of sulfuric acid, so all of the polymer substrates, except polysulfone, can be used.

In the case of acrylic acid, methacrylic acid or vinyl alcohol, cross-linking of such monomers can be completed by heating with diisocyanate as a cross-linking agent. Accordingly, the heat-resistant polymer substrate material, including vinylidene fluoride, polysulfone, polyphenylene oxide, can favorably be used.

The combination of an anion and a cation exchange group can be varied according to use. For instance, piezodialysis requires that both ion exchange groups be strong electrolytes, therefore, the combination of sulfonic acid radical and a quaternary ammonium group is preferable for this purpose. The present inventors have found that the combination of two ion exchange groups, both of which are simultaneously weak electrolytes, shows a remarkable unequal permeability to a mixture of acid and salt, or a mixture of alkali and salt, and that the separation of ingredients will become possible. For such a purpose, the combination of a carboxylic acid group and either a primary, secondary, or tertiary ammonium group, or a combination of all of them may also be employed.

The process for preparing a composite ion exchange membrane containing a sulfonic acid group and a quaternary ammonium group, the most preferable example of embodiments, will be described in detail as follows. After a solution or emulsion of a polymer having a quaternary ammonium group is coated on a microporous polymer substrate, a sulfonic acid group can be introduced by the use of sulfuric acid. The concentration of sulfuric acid is to be above 90 percent by weight. The concentration of sulfuric acid is preferably 94 to 97 percent by weight, and the desired ion exchange capacity can be obtained by a proper adjustment of time and temperature of the reaction. It is a matter of course that either the polymer having a quaternary ammonium group must have a functional group capable of receiving a sulfonic acid group, or the polymer must be mixed with another polymer having such a functional group. If these polymers possess a group capable of cross-linking in their molecular structures, cross-linking will occur together with sulfonation, and in this case any further reaction should not be needed. When a functional group is a phenyl group and the cross-linking group is a phenyl group having an alkyl halide group attached thereto, this group is cross-linked mainly with the phenyl group in the presence of concentrated sulfuric acid. Therefore, when tertiary amine is reacted with polystyrene of which some benzene rings have alkyl halide radicals to give a polymer having partly a quaternary ammonium group formed by a reaction of tertiary amine and a part of alkyl halide group, an excellent membrane can be obtained at low cost. By a proper adjustment of the reaction conditions, the molar ratio between a phenyl radical, a radical having attached thereto an alkyl halide, and a radical having attached thereto a quaternary ammonium can be arbitrarily changed, wherein the ratio between the three groups, in an ideal case, is 15–35 to 35–65 to 15–35, respectively, in molar percentage. A copolymer which can be obtained by polymerizing monomers with styrene instead of the aforementioned polystyrene should be similarly treated. Concerning alkylhalide, halogen is chlorine, bromine or the like and alkyl is methyl, ethyl or the like.

According to the present invention, the combination of an anion and a cation exchange group should be properly varied according to purposes. When a solution containing acid, alkali or salt is made to permeate, under pressure, through a membrane having either an anion or a cation exchange group only, permeation of these substances are hindered at all by virtue of the phenomenon called Donnan's equilibrium; the result of this phenomenon is the same as a reverse osmosis membrane. The object of the present invention, of course, is not to provide a process for preparing such a reverse osmosis membrane, but to provide a process for preparing the membrane which can permeate selectively either acid, alkali or salt. According to the studies of the present inventors, such permeability as to be desired can not be obtained unless the ratio of an anion to a cation exchange capacity is in the range of 0.5 to 2.0. The value of this capacity ratio is preferably 0.67 to 1.5, more preferably 0.8 to 1.25.

The amphoteric membrane thus prepared provides excellent results in separating a low molecular weight organic substance from an inorganic salt, acid or alkali as well as salt from acid or alkali.

The following examples are illustrative of the present invention and are not intended to limit the scope thereof.

EXAMPLE 1

A quantity of 11% (hereinafter all percentages are percent by weight of total solution unless otherwise designated) of polyvinyl chloride with the degree of polymerization of about 1,000 was dissolved in a mixed solvent of 1:7 by weight ratio of tetrahydrofuran and dimethylformamide. A glass cylinder having a sealed bottom was immersed in the solution, then drawn up at a constant speed of 1.7 centimeter per second, and allowed to stand in air for about 30 seconds to make the solvents partly evaporate from the polymer layer formed on the surface of the cylinder. A microporous polymer substrate was prepared by soaking the half-dried polymer layer or membrane in a 20% aqueous solution of methanol. The substrate thus obtained hindered the permeation of haemoglobin having a molecular weight of 68,000 by 95%. The substrate, as attached to the glass cylinder, was dried in air for 4 hours or more.

Separately, a coating polymer having anion exchange groups composed of 1 mole of vinylbenzyl tetraammonium chloride, 3 moles of chloromethylated styrene, and 1 mole of styrene was prepared in accordance with the following manner.

A quantity of 10% of polystyrene having 75 molar % of the benzene rings chloromethylated by a conventional method was dissolved in dioxane. A quaternatization reaction was carried out with stirring by adding to the polystyrene solution above a 5% aqueous solution of trimethylamine which corresponds to 1.6 meq per 1 g of the chloromethyl polystyrene. As the solution turned out white and turbid in the course of the reaction, methanol was added to homogenize the solution. This operation was repeated several times until the turbidity did not appear. After the reaction, methanol was eliminated from the solution under reduced pressure by the use of an aspirator and a resin was precipitated. The supernatant liquid was removed and the precipitated resin was dried in a vacuum dryer overnight. The capacity of the strong, basic, anion exchange group was measured and found to be 1.6 meq per 1 gram of the original chloromethylated polystyrene.

In a mixed solvent consisting of 1:2 by weight ratio of chloroform and ethanol, 0.5% of the resin was dissolved. The microporous polymer substrate attached to the glass cylinder was immersed in this solution, then drawn up at a constant speed of 1.1 centimeter per second and allowed to stand in air for 1 hour. The thickness of the resin on the microporous polymer substrate was estimated to be about 2,000 Å by the determination of the weight difference before and after polymer coating. The composite membrane thus prepared was peeled from the glass cylinder. The circular specimen of the composite membrane was cut into a 52 mm diameter circle and immersed in 96% sulfuric acid at 20° C. for 60 min. to cause sulfonation and cross-linking. After the reaction, the specimen was soaked stepwise in 80% and then 40% sulfuric acid each for 10 minutes. The sulfuric acid was removed from the specimen by soaking it twice in distilled water at 40° C. for 2 hours.

For the determination of the ion exchange capacity of this amphoteric membrane, about 10 sheets of small test pieces were cut from the specimen and soaked in 1 N hydrochloric acid at 40° C. for 2 hours. Test pieces were washed thoroughly in distilled water until chlorine ion was not detected and soaked again in 1/10 N of sodium hydroxide at 40° C. for 20 min., wherein an ion exchange was made to occur. The anion exchange capacity was determined by titrating silver nitrate with the coupled chlorine ions coming out of the test pieces.

The cation exchange capacity was determined by the neutralization titration of hydrogen ion that was exchanged and released by the test pieces immersed in 1 N of hydrochloric acid, washed in distilled water as described above and again immersed in 1 N of sodium chloride at 40° C. for 2 hours. The results showed that the ratio of anion to cation exchange capacity was 1.25. Moreover, the separation of the amphoteric membrane from the substrate did not occur in methanol showing that cross-linking was sufficiently complete.

The composite membrane was placed in a solution 1 N of sodium chloride, which was removed by washing with distilled water before the permeation test. In the permeation test using a 0.2% aqueous solution of sodium chloride, the composite membrane showed the permeation flow rate to be 0.5 m$^3$/m$^2$. day and the rejection was $-2.5\%$ under the pressure of 20 kg/cm$^2$.

In similar permeation tests using a 0.2% aqueous solution of magnesium sulfate, 0.1% aqueous solution of sodium hydroxide and 0.1% of hydrochloric acid, the rejection were 70, 0.2 and 0.1% respectively and the permeation flow rates were 0.45, 0.50, and 0.50 m$^3$/m$^2$. day respectively.

In the case of 3% aqueous solution of sugar, the permeation flow rate was 0.3 m$^3$/m$^2$. day and the rejection was 92%, provided that the value of the permeation flow rate was compensated by multiplying the experimental value by the viscosity of water at 20.2° C. The rejection can be expressed by the following equation.

$$\text{Rejection} = \frac{\text{Original concentration} - \text{Concentration of the permeated solution}}{\text{Original concentration}} \times 100(\%)$$

Each concentration of the aqueous solution of sodium chloride, magnesium sulfate, sodium hydroxide, and hydrochloric acid was determined respectively by silver nitrate titration, chelatometric titration using EDTA, neutralization titration and TOC concentration measurement apparatus. The amphoteric membrane thus obtained is useful for separating a low molecular weight organic substance or a divalent inorganic salt from a monovalent inorganic salt, acid or alkali.

EXAMPLE 2

The polymer material containing the strong, acidic, cation exchange group for the amphoteric ion exchange membrane consisting of different monomer units of 1 part of styrene sulfonic acid, 3 parts of chloromethyl styrene, and 2 parts of styrene was prepared as follows.

According to the conventional method, one part of polystyrene of which 50 molar % of benzene rings was chloromethylated by a conventional method was dissolved in 19 parts of ethylene dichloride, then 23 parts of 1% ethylene dichloride solution of chlorosulfonic acid was added slowly with stirring.

As a large amount of gel-like substance was precipitated after 30 minutes, ethyl ether was poured into the reacted solution, and the precipitate was recovered, which was then dried in a vacuum dryer overnight. The cation exchange capacity of this resin was found to be 1.5 meq per 1 g of the chloromethylated polystyrene. The resin was put in a mixed solvent of 1:2 by weight ratio of chloroform and methanol, a gel-like substance was filtered off, then the aforementioned mixed solvent was added in the filtrate so as to make the concentration of the resin amount to 1%. The microporous polymer substrate prepared in Example 1 was coated with this resin solution for preparing a thin layer containing a cation exchange group in accordance with procedures described in Example 1. The thin layer was estimated to be about 3,000 Å thick. Test pieces cut from the composite membrane were immersed in 90% sulfuric acid at 20° C. for 2 hours to complete the cross-linking reaction, after which they were immersed again in 40% sulfuric acid for 10 minutes, then washed in distilled water at 40° C.

The introduction reaction of an anion exchange group was carried out by immersing the composite membranes in 1% aqueous solution of trimethyl amine at 20° C. for 20 minutes. After being immersed in dilute hydrochloride acid for several minutes, washed in distilled water thoroughly, the composite membranes were placed into a 1 N aqueous solution of sodium chloride. As the result of the determination of an anion and a cation exchange capacity the ratio of the former to the latter was 0.91. Permeation tests for aqueous solutions of sodium chloride and sugar showed that each permeation flow rate was 0.40 and 0.27 m$^3$/m$^2$. day and each rejection was 5.1 and 92% respectively.

COMPARATIVE EXAMPLE 1

This example shows the performance of the amphoteric membrane prepared by the method of U.S. Pat. No. 3,945,927.

A thin membrane was formed on the microporous polymer substrate as produced in EXAMPLE 1 by the use of cyclohexane solution containing 1% of polystyrene of which 50 molar % of benzene ring was chloromethylated. Test pieces cut from the composite membrane thus formed were immersed in 98% of sulfuric acid at 20° C. for 24 hours to complete the cross-linking reaction and sulfonation. After completion of the reaction, test pieces were immersed in 80 and 40% of sulfuric acid respectively for 10 minutes, then washed in distilled water to remove sulfuric acid absorbed. In order to introduce an anion exchange group test pieces were immersed in 1% aqueous solution of trimethyl amine at 20° C. for 30 minutes. The ratio of anion to cation exchange capacity was 1.25. The result of the permeation test for the aqueous solution of sodium chloride and sugar showed that each permeation flow rate was 0.08 and 0.06 m$^3$/m$^2$. day, whereas each hindering rate was 5.5 and 55% respectively. This example clearly shows that the amphoteric membrane prepared by introducing an anion and cation exchange group into a non-polar polymer membrane by the method of U.S. Pat. No. 3,945,927 has less performance especially in the permeation fluxes than those obtained by the method of the present invention as described in Example 1 or Example 2, nevertheless, each ratio of anion to cation exchange capacity has a similar value.

EXAMPLE 3

The polymer material for a thin layer containing the weak, basic, anion exchange group composed of different monomer units of 1 part of N-vinyl ethylene diamine, 4 parts of acrylonitrile, and 3 parts of vinyl chloride (respectively in molar ratio) was prepared as follows. Ten percent of a copolymer consisting of equimolar monomers of vinyl chloride and acrylonitrile was dissolved in a mixed solvent of 1:9 by weight ratio of dimethyl formamide and ethylene diamine, and permitted to stand at 50° C. for 2 hours. When the reaction was complete, the liquid was poured into dioxane to recover the polymer. The polymer was dissolved again in a mixed solution of methanol and acetone to give a polymer solution which was poured into ethanol to recover the polymer, then the polymer thus prepared was further dissolved in a mixed solvent of 1:2 by weight ratio of chloroform and methanol to make the solution containing the polymer by 2%. The anion exchange capacity of this polymer, compared with 1 g of the original copolymer, was 0.97 meq. According to the same procedures as described in EXAMPLE 1, on the surface of a microporous polyvinyl chloride substrate, a thin membrane of the polymer containing the weak, basic, anion exchange group was formed. The thin membrane was assumed to be about 3,000 Å thick. A specimen cut from the composite membrane thus obtained was immersed in 70% of sulfuric acid containing 0.5% of formaldehyde at 40° C. for 8 hours in order to complete the cross-linking and introduce a carboxylic group. After completion of the reaction, the specimen was immersed in 40% of sulfuric acid for 10 minutes, then washed in distilled water. In order that the ion exchange capacity of this amphoteric membrane could be determined, the specimen was cut into about ten sheets of small pieces and were immersed in 1/10 N aqueous solution of sodium hydroxide at 40° C. for 2 hours. Their washing in distilled water was carried on until the pH showed neutrality. The anion exchange capacity was determined by measuring the reduced amount of the chlorine ion in hydrochloric acid, after the test pieces were immersed in hydrochloric acid of a certain concentration at 40° C. for 4 hours, whereas the cation exchange capacity was determined by subtracting the reduced amount of chlorine ion from the reduced amount of hydrochloric acid measured by a neutralization titration. The ratio of the anion to the cation exchange capacity was 0.95.

In spite of the fact that the polymer having the weak, basic, ion exchange group is soluble in acid, the polymer was not eluted in the course of hydrolysis in this Example. Therefore, cross-linking progressed rapidly even during hydrolysis.

As the results of the permeation test for the aqueous solutions of sodium chloride, magnesium sulfate, sodium hydroxide and sugar, each permeation flow rate were 0.5, 0.5, 0.5 and 0.3 $m^3/m^2$. day respectively and each rejection was 72, 30, 13 and 88% respectively. Comparing these results with those of EXAMPLES 1 and 2, it has become obvious that the amphoteric membrane with a weak acidic and a weak basic ion exchange groups is superior to the one with a strong acidic and a strong basic ion exchange groups in their ability of permeating more divalent salt than monovalent salt. The membrane thus obtained is useful for separating a low molecular weight organic substance or a monovalent inorganic salt from a divalent inorganic salt.

EXAMPLE 4

A polymer containing weak, acidic, cation exchange group for an amphoteric membrane with different monomer units of 1 part of acrylic acid, 1 part of acrylonitrile and 2 parts of vinyl chloride was prepared in the following manner.

The powder of the copolymer consisting of the equimolar monomers of acrylonitrile and vinyl chloride was allowed to swell in a 90% aqueous solution of dimethyl formamide, then put into 50% sulfuric acid to subject the nitrile group to hydrolysis and to introduce carboxylic acid group at 90° C. for 2 hours with stirring.

After the end of the reaction, the polymer was filtered off and washed thoroughly in distilled water, then dried in a vacuum dryer overnight. The cation exchange capacity of the polymer was 1.7 meq per 1 g of the original copolymer.

After the polymer was dissolved in a small amount of acetone, a mixed solvent of 1:2 by weight ratio of chloroform and methanol was added to the acetone solution of the polymer so as to make the concentration of the polymer amount to 2%. After insoluble matter was filtered off, the filtrate was coated on a microporous polyvinyl chloride substrate as prepared in EXAMPLE 1 in order to provide a thin membrane with a weak, acidic, cation exchange group. The thickness of the thin membrane was about 2,000 Å. A specimen cut from the composite membrane was immersed in 50% sulfuric acid containing 0.3% formaldehyde for 30 min., to cause the cross-linking reaction. The introduction of a weak, basic, anion exchange group into the thin membrane was conducted in a 20% ethanol solution of ethylene diamine at 30° C. for 2 hours. As the result of the determination of an anion and a cation exchange group, the ratio of the former to the latter was 0.83. In the permeation tests using aqueous solutions of sodium chloride, magnesium sulfate, and sugar, the permeation flow rates were 1.5, 1.5, and 1.3 $m^3/m^2$. day and the rejection were 63, 20 and 65% respectively.

COMPARATIVE EXAMPLE 2

This example also shows the performance of the weak amphoteric membrane prepared by the method of U.S. Pat. No. 3,945,927.

A solution prepared by dissolving 20% of a copolymer consisting of equimolar monomer units of vinyl chloride and acrylonitrile in a saturated ethanol solution of zinc bromide, as in EXAMPLE 1, was coated on the microporous polyvinyl chloride substrate as prepared in Example 1.

Zinc bromide was removed in distilled water from the specimen cut from the composite membrane thus prepared. The introduction reaction of carboxylic acid group was performed by immersing the specimen in 60% of sulfuric acid at 50° C. for 2 hours. The cross-linking reaction was carried on by immersing the specimen having the carboxylic acid group in 50% sulfuric acid containing 0.3% of formaldehyde at a room temperature for 30 minutes. The cross-linked specimen from which sulfuric acid was removed was immersed in 20% ethanol solution of ethylene diamine at 30° C. for 1 hour to introduce an anion exchange group. The ratio of anion to cation exchange capacity was 1.25. The permeation flow rates and the rejections, of the aqueous solution of sodium chloride and sugar, were 0.08 and 0.06 $m^3/m^2$. day, 40 and 76% respectively. This example also clearly shows the differences between the performance of the membrane prepared by the method of U.S. Pat. No. 3,945,927 and those obtained by the method of the present invention as described in Example 3 or Example 4.

EXAMPLE 5

In a mixed solvent of 1:2 by weight ratio of methanol and water, styrene (25%)-butadiene copolymer latex was dissolved so as to make the copolymer content amount to 2%. Eighty parts of this emulsion was poured while stirring into 100 parts of 2% methanol solution of the resin prepared according to the method of Example 1. The microporous polyvinyl chloride substrate prepared in Example 1 was coated thinly as described in EXAMPLE 1 with the blended polymer consisting of the resin with an anion exchange group and the styrene-butadiene copolymer. The layer of the blended polymer was about 5,000 Å thick. The specimen cut from the composite membrane was immersed in 95% of sulfuric acid at 20° C. for 60 minutes in order to complete the cross-linking and sulfonation reaction. The membrane was washed in distilled water, after being immersed in 80 and 40% of sulfuric acid stepwise each for 10 minutes. According to the measurement as described in EXAMPLE 1, the ratio of anion to cation exchange group capacity was 1.11. The thin membrane did not separate from the substrate in methanol, and the completeness of the cross-linking was evident from the fact that the resin having an anion exchange group was not dissolved in the same solvent. In the permeation tests using aqueous solutions of sodium chloride and sugar, each permeation flow rate was 1.0 and 0.6 $m^3/m^2$. day, each rejection was $-0.3$ and 82% respectively.

What is claimed is:

1. A process for preparing a composite amphoteric ion exchange membrane, which comprises forming a thin membrane not exceeding 5 microns thick by applying to a microporous polymer substrate having a physical, selective permeability of its own, a coating consisting of a polymer having either a cation or anion exchange group and a functional group capable of receiving another ion exchange group having an opposite sign from the cation or anion exchange group or a mixture of two polymers one of which was either a cation or an anion exchange group and the other of which has a functional group capable of receiving an ion exchange group having an opposite sign from the cation or anion exchange group, and introducing the ion exchange group having an opposite sign to said functional group to provide a ratio of anion to cation exchange capacity in the range of from 0.5 to 2.0.

2. The process according to claim 1, wherein the ratio of anion to cation exchange capacity is in the range of from 0.67 to 1.5.

3. The process according to claim 2, wherein the ratio of anion to cation exchange capacity is in the range of from 0.8 to 1.25.

4. The process according to claim 1, wherein the microporous polymer substrate is coated with a composition containing a polymer having a quaternary ammonium group and a functional group capable of receiving a sulfonic acid group, the composition is cross-linked in the presence of concentrated sulfuric acid, and the introduction of the sulfonic acid group and cross-linking are simultaneously carried out in the presence of concentrates sulfuric acid.

5. The process according to claim 1, wherein the microporous polymer substrate is coated with a composition containing two polymers, one of which has a quaternary ammonium group and a functional group capable of being cross-linked in the presence of sulfuric acid and the other of which has a functional group capable of receiving a sulfonic acid group and a functional group capable of being cross-linked in the presence of sulfuric acid, the introduction of the sulfonic acid group and the cross-linking being simultaneously carried out in the presence of concentrated sulfuric acid.

6. The process according to claim 4, wherein the functional group capable of receiving a sulfonic acid group is a phenyl group and the functional group capable of being cross-linked is a phenyl group having attached thereto an alkyl halide group.

7. The process according to claim 5, wherein the functional group capable of receiving a sulfonic acid group is a phenyl group and the functional group capable of being cross-linked is a phenyl group having attached thereto an alkyl halide group.

8. The process according to claim 4, wherein a polystyrene in which some benzene rings have an alkyl halide group is modified to possess a quaternary ammonium group by the use of tertiary amine which reacts with a part of said alkyl halide group and the microporous polymer substrate is coated with the polymer thus modified.

9. The process according to claim 4, wherein the concentration of sulfuric acid is 90 percent by weight or more.

10. The process according to claim 5, wherein the concentration of sulfuric acid is 90 percent by weight or more.

11. The process according to claim 8, wherein the concentration of sulfuric acid is 94 to 97 percent by weight.

12. The process according to claim 1, wherein the anion is one member or a mixture of at least two members selected from the group consisting of a primary, a secondary and a tertiary ammonium group and the cation is carboxylic acid.

13. The process according to claim 1, wherein the microporous polymer substrate is polyvinyl chloride.

14. A process for preparing a composite amphoteric ion exchange membrane, which comprises forming a thin membrane not exceeding 5 microns thick by applying to a microporous polymer substrate having a physical, selective permeability of its own, a coating consisting of a polymer having an ion exchange group which is either a quaternary ammonium group or a sulfonic acid group and a functional group capable of receiving the other exchange group or of a mixture of two polymers one of which has an ion exchange group which is either a quaternary ammonium group or a sulfonic acid group and the other of which has a functional group capable of receiving the other exchange group; and introducing said other ion exchange group to said functional group to provide a ratio of anion to cation exchange capacity in the range of 0.5 to 2.0.

* * * * *